INVENTORS.
PAUL F. HAYNER
GERALD LEON BERNIER

| LOAD | LOAD EQUIV. MAX. | PC1 | PC2 | ΔP RESTRICTORS | PV2 - PV1 | MOTION |
|---|---|---|---|---|---|---|
| NEGATIVE | 2000 PSI | 2500 | 500 | 2500 | X | M |
| 0 | 0 | 1500 | 1500 | 1500 | 3X | 3M |
| POSITIVE | 2000 PSI | 500 | 2500 | 500 | 5X | 5M |

Nov. 1, 1966

P. F. HAYNER ETAL 3,282,168

HYDRAULIC SERVO CONTROL SYSTEMS

Filed Sept. 5, 1963

A - MAX. NEGATIVE EXTERNAL LOAD
B - NO LOAD
C - MAX. POSITIVE EXTERNAL LOAD

INVENTORS.
PAUL F. HAYNER
GERALD LEON BERNIER
BY

ATTORNEY

United States Patent Office 3,282,168
Patented Nov. 1, 1966

3,282,168
HYDRAULIC SERVO CONTROL SYSTEMS
Paul F. Hayner, Lexington, and Gerald Leon Bernier, Lawrence, Mass., assignors to Sanders Associates, Inc., Nashua, N.H., a corporation of Delaware
Filed Sept. 5, 1963, Ser. No. 306,854
8 Claims. (Cl. 91—420)

This invention relates to a hydraulic servo control system, and, more particularly, to such systems employing laminar flow proportional position servo valves characterized by low noise, high reliablity, low leakage, and constant gain with temperature and load changes. While our system has particular utility in submarine steering, diving, and hovering controls, wherein low noise and high reliability are important, it will be understood that it may be used in other environments wherein the above qualities are important.

Among the objects of our invention are:

To provide such a system having very low acoustical, mechanical, and fluid flow noises;

To provide such a system in which the output flow varies directly with the input signal, and is substantially independent of temperature and load;

To provide such a system embodying laminar flow restrictors, and having a flow measuring instrument;

To provide a multi-stage system having all the advantages of flapper and jet pipe systems, plus low leakage;

To provide such a system providing load and temperature compensation to provide constant flow gain;

To provide such a system incorporating control line pressure sensing for load compensation, and laminar restrictors for temperature compensation.

Still other objects and advantages of our invention will be apparent from the specification.

The features of novelty which we believe to be characteristic of our invention are set forth with particularity in the appended claims. Our invention itself, however, both as to its fundamental principles and as to its particular embodiments, will best be understood by reference to the specification and accompanying drawing, in which FIG. 1 is a diagrammatic view, partly in section, of a system according to our invention;

Figures 3, 4A:
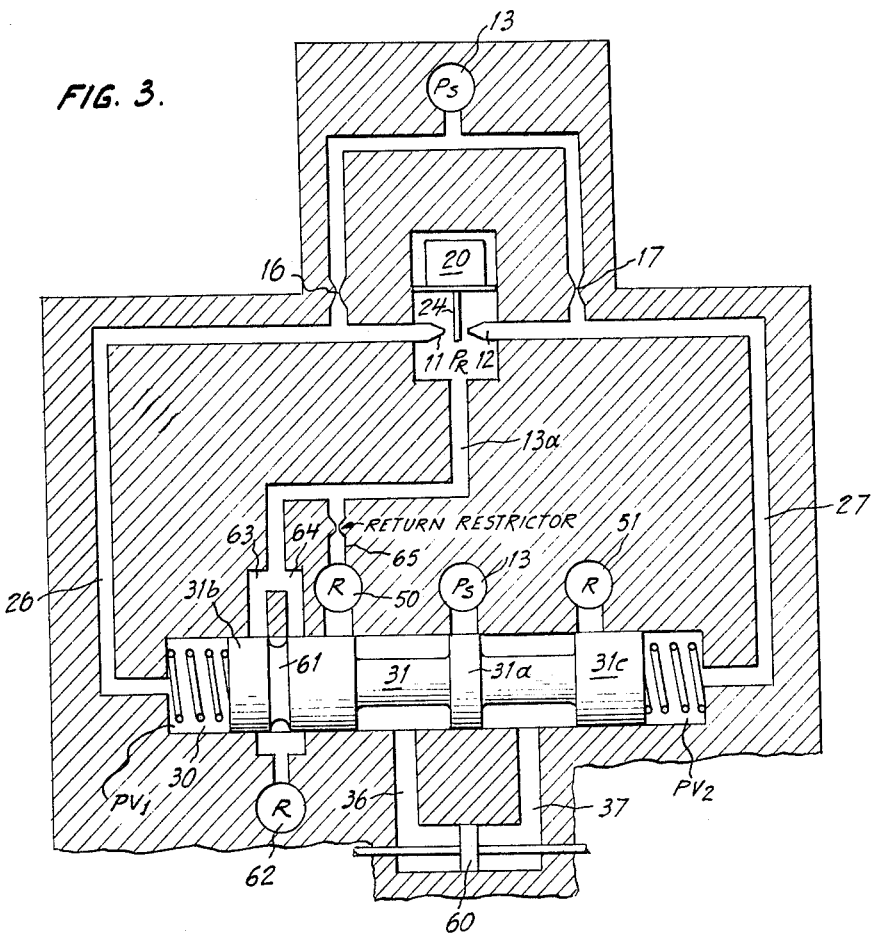
FIG. 3 is a diagrammatic view of our system embodying the low leakage flapper or jet servo valve in a two-stage servo system.
Figure 4:
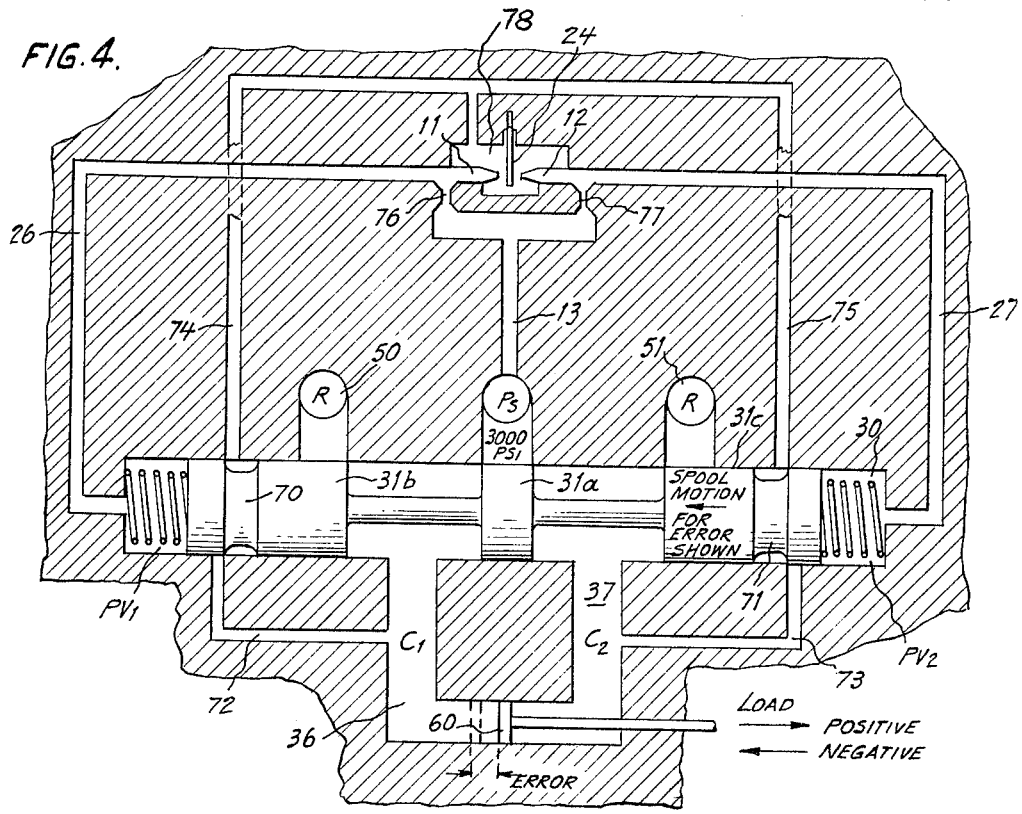
Figure 5:
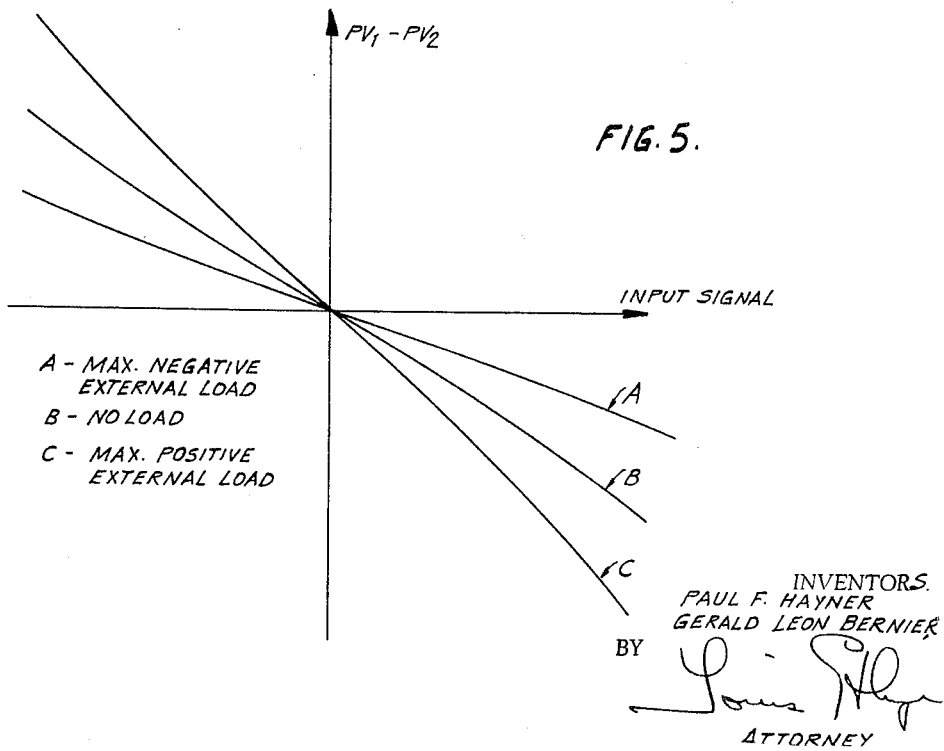

FIG. 4 is a diagrammatic view, partly in section, of a constant gain hydraulic servo valve according to our invention, FIG. 4a is a table applicable to FIG. 4, and FIG. 5 is a series of curves showing the relation between input signal and pressure differential on the output control spool ($P_{V1}-P_{V2}$) for maximum negative external load, no load, and maximum positive external load, respectively.

Figure 1:
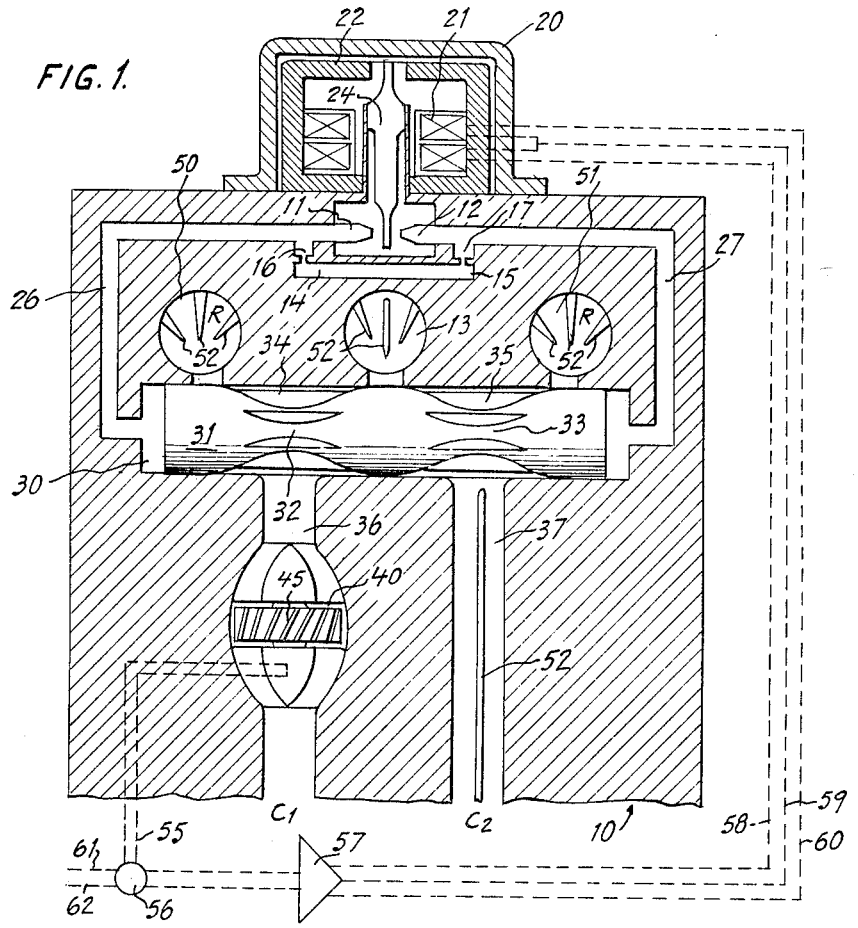

Referring now to FIG. 1, 10 designates the valve casing having the control jets 11 and 12, to which liquid under pressure is supplied from pilot line conduit 13 through lines 14 and 15 and restrictors 16 and 17 adjacent jets 11 and 12. These constitute a hydraulic amplifier.

Mounted on top of casing 10 is the electromagnetic control housing 20 containing the coils 21 and pole pieces 22 which control the position of flapper 24, which moves from left to right or vice versa to abut jet 11 or 12. Conduits 26 and 27 lead from upstream of jets 11 and 12 to opposite ends of piston chamber 30 containing laminar flow piston valve 31, which is arranged for axial motion to determine the flow of fluid.

The piston has two reduced portions 32 and 33 intermediate its ends provided with radial extending laminar flow vanes 34 and 35 in the reduced portions, and the reduction of area is in the form of a continuous smooth curve as shown in FIG. 1.

Control conduits 36 and 37 open into valve chamber 30 and lead to the load (not shown in FIG. 1), which may be a hydraulic piston operating in either direction, such as shown in U.S. Patent 2,939,430.

Figure 2:
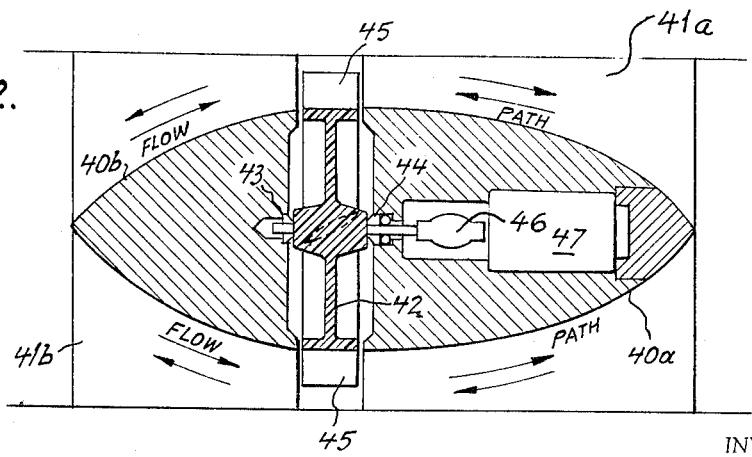
FIG. 2 is a detail view, partly in section, of the flow indicator shown in FIG. 1.

Conduit 36 contains a flow indicator 40, shown on an enlarged scale in FIG. 2. The flow indicator is formed by a pair of semi-elliptical end pieces 40a and 40b provided with radially and longitudinally extending vanes 41a and 41b to provide laminar flow. Positioned between the end pieces is a rotor 42, journalled in low friction bearings 43 and 44 (FIG. 2), carrying on its periphery a series of skew blades 45. The rotor is preferably formed of light weight plastic, floats in the hydraulic fluid, is impervious to shock, and has a low inertia for fast response.

Connected to rotor 42 through coupling 46 we provide a tachometer 47 having a low inertia rotor, to measure fluid flow in conduit 36, and with suitable means such as leads 55 for indicating andor /transmitting the tachometer reading, to determine the actual fluid flow. Return conduits 50 and 51 leading from the load (FIG. 1) are provided with laminar flow vanes 52, as are pilot conduit 13 and control conduit 37.

The output of the tachometer is fed to a suitable summing network 56, which feeds amplifier 57, which, through leads 58, 59, and 60, controls the position of flapper 24. The summing network may be supplied with input signals, through leads 61 and 62, these signals being proportional to the system error signal.

In neutral or null position, as shown in FIG. 1, the piston 31 is midway of its travel, and pilot line 13 and return lines 50 and 51 are closed. As the piston moves to the left, pilot line 13 is opened to control line 37, return line 51 is closed, and return line 50 is opened, the area of the opening being proportional to movement of the piston from center position. As the piston moves to the right from central position, pilot conduit 13 is opened into control conduit 36, return conduit 50 is closed, and return conduit 51 is opened. In either case, fluid flow passes through control conduit 36 in one direction or the other, and actuates the tachometer to provide a measurement of flow, regardless of direction and amount.

Referring now to FIG. 3, we have shown a modified form of our invention, particularly effective in reducing leakage in the system when the valve has zero input signal. In all types of hydraulic amplifiers heretofore known, leakage is excessive after even a small amount of use.

In FIG. 3, for simplicity, we have shown the various conduits and valves, together with the load. In this instance, as before, 11 and 12 are the jets, 24 the flapper, and 20 the housing containing the coils and pole pieces for actuating the flapper. As before, conduits 26 and 27 lead from upstream of the jets to opposite ends of valve chamber 30. In this instance, again, valve 31 is shown in the center or null position, in which pilot conduit 13 is closed by central valve land 31a, and return conduits 50 and 51 are closed by end valve lands 31b and 31c respectively, and no fluid is admitted to conduits 36 or 37 to move the load piston 60 in its cylinder. Land 31b is provided with a circumferential groove 61. In this instance, the pilot return conduit 13a is bifurcated at the valve end into portions 63 and 64 which are closed by valve 31 in center or null position. In this instance, return conduit 50 connects to pilot return conduit 13a through return restrictor 65.

In operation, for any signal, valve 31 moves away from neutral or null position, thus opening the pilot return line 13a through branch 63 or 64, and connecting it to system return conduit 62, or whatever serves as pilot return during normal operation. Leakage through the return restrictor 65 is insignificant. For a zero input signal, the valve 31 centers itself and shuts off the system return, and any pilot stage leakage must flow through the return restrictor 65, which limits the leakage to an acceptable amount. Thus, it will be seen that, whereas all flapper and jet pipe valves heretofore known have had high leakage at neutral or zero signal position, and piston type pilot valves have dead space to obtain low leakage and are subject to wear, the embodiment of our invention just described gives all the advantages of flapper and jet pipe valves plus low leakage. It should be noted that restriction can be afforded by a series of orifices, for instance, in order that low leakage be maintained without requiring small orifices subject to change due to wear or erosion.

Referring now to FIGS. 4, 4a, and 5, we have shown still another embodiment of our invention, in this instance a more nearly constant gain open loop system, particularly effective in maintaining more nearly constant gain in spite of temperature and load changes without requiring flow measurement and feedback devices. We have found that gain variations with load and temperature changes were excessive, especially with laminar flow (low noise) valves.

$$Q \text{ laminar} = KA\frac{\Delta P}{\rho} \quad Q \text{ turbulent (orifice)} = KA\sqrt{\Delta P}$$

We have found, according to this invention that this problem is solved by using control line pressures in the hydraulic amplifier, the appropriate control line being selected by the error signal. By reference to FIG. 4a it will be seen that at null or any position and at zero load the pressure in control lines 36 and 37 is equal, in this instance 1500 p.s.i., whereas for negative load (aiding the direction of correction) the pressure in line 36 ($C_1$) is 2500 p.s.i. and that in line 37 ($C_2$) is 500 p.s.i. For positive load (opposing the direction of correction) the values are reversed; i.e., in line 36 ($C_1$) the pressure is 500 p.s.i., and in line 37 ($C_2$), 2500 p.s.i. In the heretofore known systems, the position of the servo valve piston or spool was a function of input command only. If the loading changed the effective pressure drop across the restriction, the flow changed and likewise the flow gain changed.

According to the embodiment of our invention shown and described with reference to FIGS. 4, 4a and 5, piston or spool position is made a function of loading, as well as of input command signal. The direction of loading is sensed and the appropriate control line pressure is used to compensate for loads by adjusting the pressure differential across the piston or spool. Spool position is also made a function of temperature by the use of laminar restrictors in the pilot stage. These restrictors respond to the temperature changes and cause spool differential pressures to vary accordingly, a concern especially in laminar flow designs.

The following, it is believed, will aid in understanding FIGS. 4, 4a and 5. With a positive load (a load opposing the direction of correction), a smaller pressure differential appears across the control restrictor than with a negative load (a load aiding the direction of correction). The lower control pressure is sensed and used as the pilot return pressure. This greater pressure differential in the pilot stage results in a greater pressure differential across the output spool and hence greater spool motion. The greater flow area (reduced restriction) as a result of this motion compensates for the lower pressure drop across it, and yields the desired flow. With a negative load, high restrictor pressure drop (lower flow area) is compensated for by lower output spool differential and a greater control restriction. In laminar valves especially, temperature variations will cause changes in flow $$\left(Q = K\frac{\Delta P}{V}\right)$$

where V is viscosity and decreases with temperature rise. In the pilot stage, higher temperatures result in lower pressure drops across the laminar restrictors. This causes the spool pressure differential to decrease, and by reduced spool motion, increases the control restriction (reduces flow area). A higher restriction compensates for lower viscosity.

In this figure (FIG. 4), as before, 11 and 12 represent the jets and 24 the flapper, 13 the pilot supply conduit, 30 the spool valve chamber, 26 and 27 the conduits from jets 11 and 12 to opposite ends of valve chamber 30. 36 and 37 are the control conduits leading to opposite sides of load piston 60.

In this embodiment of our invention, land 31b of spool 31 is provided with a circumferential groove 70, and land 31c with a similar groove 71. Conduit 72 leads from control line 36 ($C_1$) to conduit 74 connected directly to flapper return chamber 78 and conduit 75 also connected directly to flapper return chamber 78. Both said conduits are closed when spool 31 is in null position. Pilot supply line 13 leads, through laminar restrictors 76 and 77, to jets 11 and 12. The dotted position of the piston 60, compared to the actual position in full lines, is the error; i.e., the dotted position is the position piston 60 should have.

In this figure, the error is sensed by comparing the actual position of the load piston with the position it should have, and a signal is generated which is applied to the flapper to supply fluid to conduit 27, moving piston 31 to the left, opening the pilot supply port to conduit 37 and moving load piston from the full line position to the dotted position, thus eliminating the error. At the same time, motion of the piston 31 to the left connects control line 36 ($C_1$) through line 72, groove 70 and line 74 to the flapper chamber. When this occurs, the error signal disappears, the flapper returns to null position, and piston 31 returns to null position, closing the pilot supply port to conduit 37, and stopping motion of load piston 60 at the correct position.

Referring to the table, FIG. 4a, the first column indicates the load, negative, zero, or positive; column 2 indicates the load equivalent maximum for the three conditions respectively, i.e., 2000 p.s.i., zero, and 2000 p.s.i. The third column is the pressure in conduit 36 in p.s.i. for the three conditions, i.e., 2500, 1500, and 500; the fourth column the pressure in conduit 37 for the same three conditions, namely, 500, 1500, and 2500.

Column 5 shows $\Delta P$ at the restrictors for the same three conditions, to wit, 2500, 1500, and 500. Column 6 shows $P_{V2}-P_{V1}$ (the pressures at opposite ends of the spool 31) relatively for the three conditions above as X, 3X, and 5X, and column 7 the relative motions produced by these pressures, i.e., $m$, $3m$, and $5m$.

Referring now to FIG. 5, in which the ordinates represent the pressure differential on spool 31, $P_{V1}-P_{V2}$, plotted against input signal as abscissae, curve A shows conditions for negative load, curve B for no load, and curve C for positive load. From this it is shown graphically that for negative load the pressure differential is the least over the load range, for positive load it is the greatest, and for no load it is intermediate.

In the foregoing we have shown certain preferred embodiments of our invention, and the best mode presently known to us for practicing the same, but it should be understood that modifications and changes may be made without departing from the spirit and scope of our invention.

What is claimed is:

1. In a hydraulic servo system having a hydraulic piston load, means including a plurality of liquid conduits for supplying liquid to opposite sides of said piston for actuation thereof, and a hydraulic servo valve for controlling flow of liquid to said piston load, said valve forming a piston movable in a chamber to open and close ports proportionately, said valve piston having circumferentially reduced portions defined by a smooth, continuous longitudinal curve so that said piston is gradually tapered to and from the minimum sectional dimension of said reduced portions, said valve piston presenting a convex surface to said ports to effect laminar flow of liquid passing therethrough said circumferentially reduced portions having a plurality of radially extending vanes disposed therein.

2. The combination claimed in claim 1 in which at least some of the liquid conduits in said system are provided with vanes to provide laminar flow.

3. The combination claimed in claim 1 having in a conduit leading to said load means for measuring the flow of liquid therein.

4. The combination claimed in claim 3 in which said means for measuring comprises a rotor wheel having blades actuated by flow of liquid.

5. The combination claimed in claim 3 in which said means for measuring includes a turbine wheel coupled to a tachometer.

6. The combination claimed in claim 5 in which said turbine wheel is formed of light weight plastic floating in the liquid in said conduit.

7. The combination claimed in claim 5 in which the rotor of said tachometer has relatively low inertia to provide quick response to liquid flow.

8. In a hydraulic servo system, in combination, a flapper and jet pipe valve controlling a piston servo valve in turn controlling a piston load and including control conduits to said piston load, means for controlling the position of said servo valve piston as a function of an input signal, means in one of said control conduits for measuring the flow of liquid therein, and means for controlling said servo valve piston as a function of load, said means for controlling said servo valve piston as a function of load being responsive to the liquid flow measuring means.

References Cited by the Examiner

UNITED STATES PATENTS

| | | | |
|---|---|---|---|
| 2,146,827 | 2/1939 | Kruspi | 73—231 |
| 2,242,656 | 5/1941 | Moore | 91—363 |
| 2,709,366 | 5/1955 | Potter | 73—231 |
| 2,886,009 | 5/1959 | Myers | 91—363 |
| 2,934,938 | 5/1960 | Rhoades | 91—363 |
| 2,939,430 | 6/1960 | Westbury | 91—363 |
| 2,969,773 | 1/1961 | Henry | 91—363 |
| 2,971,536 | 2/1961 | Junck et al. | 251—282 |
| 3,071,061 | 1/1963 | Goldsmith | 138—40 |
| 3,198,212 | 8/1965 | Junck et al. | 251—282 |

MARTIN P. SCHWADRON, *Primary Examiner.*

SAMUEL LEVINE, *Examiner.*

P. E. MASLOUSKY, *Assistant Examiner.*